J. Eaton.

Making Cop Tubes.

N° 12,311.

Patented Jan. 30, 1855.

UNITED STATES PATENT OFFICE.

JAMES EATON, OF TOWNSEND HARBOR, MASSACHUSETTS.

DIE FOR COP-TUBE MACHINES.

Specification of Letters Patent No. 12,311, dated January 30, 1855.

*To all whom it may concern:*

Be it known that I, JAMES EATON, of Townsend Harbor, in the county of Middlesex and State of Massachusetts, have invented certain new and useful Improvements in the Construction of Dies for Forming Cop-Tubes, of which the following is a full, clear, and exact description, reference being had to the annexed drawings, making part of this specification, in which—

Figure 1:
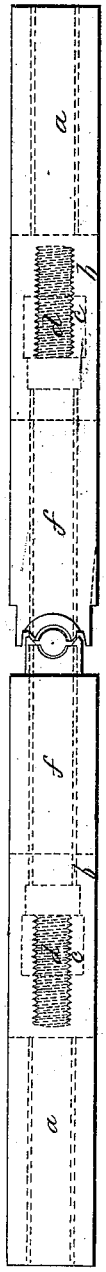
Figure 2:
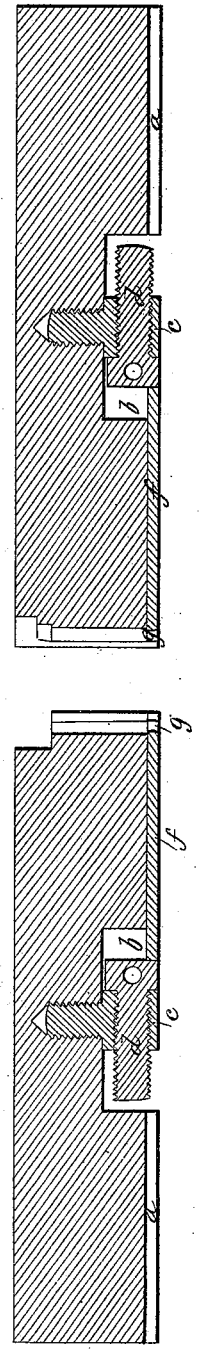
Figure 3:

Figure 1 is a plan of the dies. Fig. 2 a longitudinal section through the center of the same. Fig. 3 end views of the dies.

Various methods have been adopted for the purpose of adapting the step which sustains the tube while the flange is being formed, to the die which forms the tube.

In Letters Patent granted Nathaniel Whitmore on the 12 day of June 1847 the step was operated separately from the die and by independent mechanism. In the letters additional to this patent this part of the mechanism was much simplified, the step being secured to the under surface of the dies the spindle being shortened so as to bear upon the upper surface of the rest. This construction was found to be faulty, for should a scrap of tin or other substance fall upon the step the next time the spindle descended, the machine was either stopped or broken. To remedy this inconvenience the spindle was again lengthened as in the original Letters Patent, and the step was secured firmly to the die by screws. So great however was the wear upon the step by the constant cutting action of the sheet iron that its upper edge was very soon worn away, and the bottom of the tube instead of being sustained by the step was jammed between it and the spindle, and this was again the cause of stoppages and breakages. Whenever the step was thus worn it consequently became necessary to replace it, and this occurred so frequently as to cause a serious item of expense. To remove which is the object of my present invention, which consists in so securing the step to the die that it may at any time be dressed off and again brought up to its place at a comparatively small cost, and with slight delay of the machine, which is thus enabled to be kept constantly at work, while the cost of its repairs is materially reduced.

To enable others skilled in the art to understand my invention I will proceed to describe the method which I have adopted of carrying it out.

Longitudinally through the center of the dies is plowed a dovetailed groove $a$,—and transversely across the center of the same is planed the recess or opening $b$.

$c$ is a block which is firmly secured to the die within the recess $b$, and is tapped to receive the set screw $d$.

$f$ is the step which like the die is made of hardened steel—it is slid into the recess $b$, and by means of the screw $d$ is forced out so as to project beyond the face of the die at $g$, an amount equal to the thickness of the tin of which the tubes are made. When worn away so as to require to be dressed up it is withdrawn from its slot and after being put in order is again set up to the spindle by the screw $d$, very little time being consumed by the operation, and the machine may be run almost uninterruptedly.

What I claim as my invention and desire to secure by Letters Patent in machines for making cop tubes is—

The method herein described of securing the step to the die, for the purpose set forth.

JAMES EATON.

Witnesses:
 SAM. COOPER,
 JOHN S. CLOW.